(12) United States Patent
Altes et al.

(10) Patent No.: US 7,153,902 B2
(45) Date of Patent: Dec. 26, 2006

(54) HIGH SOLIDS EMULSIONS OF ELASTOMERIC POLYMERS

(75) Inventors: Michael Gene Altes, Midland, MI (US); Craig Steven Gross, Midland, MI (US); Lee Bowen Jensen, Midland, MI (US); Shaow Burn Lin, Midland, MI (US); Anil Kumar Saxena, Midland, MI (US); Todd Matthew Starke, Bay City, MI (US); Toshio Suzuki, Midland, MI (US); Raymond Lee Tabler, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 316 days.

(21) Appl. No.: 10/779,962

(22) Filed: Feb. 17, 2004

(65) Prior Publication Data

US 2004/0162386 A1    Aug. 19, 2004

Related U.S. Application Data

(62) Division of application No. 09/905,664, filed on Jul. 13, 2001, now Pat. No. 6,737,473.

(51) Int. Cl.
*C08K 3/00* (2006.01)

(52) U.S. Cl. .................. 524/801; 524/60; 524/80; 524/588; 524/806; 524/804; 524/837

(58) Field of Classification Search ............. 524/801, 524/804, 837, 806, 588, 60, 80
See application file for complete search history.

(56) References Cited

U.S. PATENT DOCUMENTS

| | | | |
|---|---|---|---|
| 5,356,988 A * | 10/1994 | Nothnagel .................. 524/556 |
| 5,421,866 A * | 6/1995 | Stark-Kasley et al. ......... 106/2 |
| 5,426,167 A | 6/1995 | Powers et al. ............... 526/347 |
| 5,539,021 A | 7/1996 | Pate et al. .................. 523/335 |
| 5,543,484 A * | 8/1996 | Chung et al. ............. 526/347.1 |
| 5,554,726 A | 9/1996 | Araki et al. ................. 528/495 |
| 5,574,091 A | 11/1996 | Walther et al. ............. 524/570 |
| 5,641,433 A | 6/1997 | Chirinos et al. ............ 252/312 |
| 5,688,842 A | 11/1997 | Pate, III et al. ............. 523/335 |
| 5,744,544 A * | 4/1998 | Dunaway et al. ........... 524/832 |
| 5,763,505 A * | 6/1998 | Derian et al. ............... 523/322 |
| 5,798,410 A | 8/1998 | Walther et al. ............. 524/570 |
| 5,806,975 A | 9/1998 | Hosokawa et al. ......... 366/301 |
| 5,840,800 A * | 11/1998 | Joffre et al. ................ 524/806 |
| 5,942,574 A | 8/1999 | Hosokawa et al. ......... 524/837 |
| 6,103,786 A * | 8/2000 | Hoch et al. ................ 523/336 |
| 6,156,806 A | 12/2000 | Piechocki et al. ............ 516/64 |
| 6,177,519 B1 | 1/2001 | Chung et al. ............... 525/263 |
| 6,737,473 B1 * | 5/2004 | Altes et al. ................ 524/806 |

FOREIGN PATENT DOCUMENTS

EP      463431 A2 *   1/1992
JP      10-36575  *   2/1998

* cited by examiner

*Primary Examiner*—David W. Wu
*Assistant Examiner*—Henry S Hu
(74) *Attorney, Agent, or Firm*—Alan Zombeck

(57) ABSTRACT

Water-continuous emulsion of elastomeric polymers are disclosed having a solids content of greater than 75%, an average particle size less than 5 μm, and having sufficient stability to produce a stable lower solids emulsion upon dilution with water comprising; an elastomeric polymer, surfactant, water, optional plasticizer, optional low molecular weight acid, and is essentially free of organic solvents. The water-continuous emulsions of elastomeric polymers can be prepared by; (I) forming a premix that is essentially free of organic solvents comprising an elastomeric polymer and surfactant, and optionally a plasticizer and low molecular weight acid, and (II) adding water to the premix with mixing to form a water continuous emulsion of the elastomeric polymer having a solids content of greater than 75%, an average particle size less than 5 μm, and having sufficient stability to produce a stable lower solids emulsion upon dilution with water.

15 Claims, No Drawings

HIGH SOLIDS EMULSIONS OF ELASTOMERIC POLYMERS

CROSS REFERENCE

This application is a divisional of application Ser. No. 09/905,664, filed Jul. 13, 2001 now U.S. Pat. No. 6,737,473.

FIELD OF THE INVENTION

This invention relates to water-continuous emulsions of elastomeric polymers and processes for preparing such emulsions. In particular, this invention relates to high solids water-continuous emulsions of elastomeric polymers having a solids content greater than 75%, an average particle size less than 5 µm, and are essentially free of organic solvents.

BACKGROUND OF THE INVENTION

Emulsions of high molecular weight polymers are commonly prepared using emulsion polymerization or suspension polymerization techniques. These techniques involve first preparing emulsions or suspensions of the monomer starting materials, and subsequently polymerizing the monomers in-situ to create the high molecular weight polymers. Such techniques avoid the handling and processing problems associated with high molecular weight polymers. However, the type of high molecular weight polymers that can be prepared by such techniques are often limited, and furthermore, the resulting physical properties of the emulsions can often limit their use in many applications.

Alternatively, emulsions of high molecular weight polymers have been prepared by first dispersing the preformed high molecular weight polymer in a solvent. Some representative examples of this art are shown and others further discussed in U.S. Pat. Nos. 4,177,177 and 6,103,786. Also representative of this art are techniques known to create latex emulsions, illustrative examples of this art are taught in U.S. Pat. Nos. 3,360,599, 3,503,917, 4,070,325, 4,243,566, 5,554,726, 5,574,091 and 5,798,410, where the high molecular weight polymer is dispersed in a solvent and is subsequently emulsified.

High internal phase emulsions of high molecular weight polymers are described in U.S. Pat. Nos. 5,539,021, 5,688,842, and 6,156,806. However, these examples also require the use of organic solvents to dissolve the high molecular polymers.

The presence of solvent in emulsions can be hazardous in certain applications or limit usage in other instances because of environmental concerns. For example, many of the commercially important volatile organic solvents are also hazardous to health and environment such as ozone depletion, air pollution, and water contamination. The presence of such volatile solvents in emulsions are highly undesirable to both the producers and the users of emulsions as special handling precautions and equipments are required to minimize the workers' exposure and release to environment.

Alternative techniques have thus been sought to prepare emulsions of preformed high molecular weight polymers that avoid the shortcomings mentioned above. For example, U.S. Pat. No. 4,123,403 provides a continuous process for preparing aqueous polymer microsuspensions. Aqueous microsuspensions of solid polymers (e.g. melting above 20° C.) are prepared by a continuous process comprising the steps of (a) forming a heterogeneous composition having a discontinuous aqueous phase and a continuous polymer phase at temperatures above the polymer melting point, and (b) converting the resulting polymer continuous heterogeneous composition to a water-continuous heterogeneous composition. The '403 patent describes its process as useful for solid polymers, and for thermoplastic solids whose degradation point is somewhat higher than its melting point, and is particularly useful for polymers having a melt flow rate of less than about 40, and temperature sensitive polymers.

Emulsions of high molecular weight polyisobutylene have been reported in Japanese Patent Application Publications 58208341, 59122534, 7173346, 10204234, and 10204235. The publications describe polyisobutylene emulsions having a 1–75% solid content which are prepared with specific types of surfactants, for example a combination of polyoxyethylene-oxypropylene block polymer with polyoxyethylene alkyl ether sulfate ester are described in JP 10204234.

Emulsions of pre-formed high molecular weight silicones have been reported. For example, U.S. Pat. Nos. 5,806,975 and 5,942,574 describe a method for continuous emulsification of organopolysiloxane gums involving a compounding extruder of a specific design, which requires a minimum shear rate of 10 sec⁻. While the '975 and '574 patents describe its apparatus and method as capable of emulsifying organopolysiloxane gums having a viscosity in excess of 500,000 centipoise, examples were limited to a trimethylsiloxy-endblocked dimethylpolysiloxane gum with a viscosity of 10 million centipoises (10 KPa-s).

U.S. Pat. No. 5,840,800 describes crosslinked emulsions of pre-formed silicon modified organic polymers having a viscosity of 5–500 Pa-s and a glass transition temperature of less than 20° C. The '800 process describes the formation of a crosslinked emulsion by a) forming an emulsion of silicon modified organic polymers having a viscosity of 5–500 Pa-s (or 0.005–0.5 KPa-s) and b) allowing crosslinking to occur within the emulsion resulting in emulsions of crosslinked polymers.

There is a need for improved processes for the production of emulsions of preformed high viscosity elastomeric polymers using little or no solvents to enhance emulsion formation. There is also a need for processes for the production of emulsions of preformed high viscosity elastomeric polymers with curable functionalities using little or no solvents. Furthermore, high solids emulsions of elastomeric polymers that are stable with time, and can be further diluted to produce stable emulsions are sought in many industrial processes such as coating applications. Processes are needed for the preparation of high solids emulsions of preformed high viscosity elastomeric polymers and elastomeric polymers with curable functionalities. A high solids emulsions (e.g. 75% by weight) of such elastomeric polymers will allow development of higher solids, water-based coatings, adhesives, and sealants formulations without solvents, or volatile organic compounds. The preparation of a high solids emulsion of high viscosity elastomeric polymers with curable functionalities will allow development of curable or crosslinkable coatings, adhesives, and sealants formulations with improved properties, performance and stability over their non-curable or pre-crosslinked elastomeric polymer analogues.

Heretofore a method has not been disclosed for the preparation of stable water-continuous emulsions of high viscosity elastomeric polymers having a high solids content, which also yields stable lower solids emulsions upon dilution, and contains little or no organic solvents.

An object of this invention is to provide a process for preparing water continuous emulsions of elastomeric polymers that are essentially free of organic solvents.

It is a further object of this invention to provide water continuous emulsions of elastomeric polymers with a solids content greater than 75% by weight having a particle size of less than 5 μm (micrometers) that are stable with time.

It is yet a further object of this invention to provide stable emulsions of elastomeric polymers prepared by the dilution of the high solids emulsions of the elastomeric polymer.

SUMMARY OF THE INVENTION

This invention relates to a water-continuous emulsion of elastomeric polymers having a solids content of greater than 75%, an average particle size less than 5 μm (micrometers), and having sufficient stability to produce a stable lower solids emulsion upon dilution with water comprising; an elastomeric polymer, surfactant, water, optional plasticizer, optional low molecular weight acid, and is essentially free of organic solvents.

This invention also relates to processes for preparing water-continuous emulsions of elastomeric polymers. In one embodiment, the process comprises; (I) forming a premix that is essentially free of organic solvents comprising an elastomeric polymer and surfactant, and optionally a plasticizer and low molecular weight acid, and (II) adding water to the premix with mixing to form a water continuous emulsion of the elastomeric polymer having a solids content of greater than 75%, an average particle size less than 5 μm, and having sufficient stability to produce a stable lower solids emulsion upon dilution with water. In a second embodiment, the water continuous emulsions of elastomeric polymers can be prepared by adding the water to a premix of elastomeric polymer, surfactant, optional plasticizer, and optional low molecular weight acid in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the elastomeric polymer. The present inventors have unexpectedly found this stepwise addition of water in small incremental portions allows for the formation of the emulsion and enhances the emulsion stability at relatively high solids contents.

DETAILED DESCRIPTION OF THE INVENTION

This invention relates to a water-continuous emulsion composition comprising;
(A) 100 parts of an elastomeric polymer having a viscosity of 0.5–1,000,000 KPa-s and a glass transition temperature up to 50° C.,
(B) 3 to 30 parts surfactant
(C) 5 to 45 parts water wherein the water-continuous emulsion has a solids content of greater than 75%, an average particle size less than 5 μm (micrometers), having sufficient stability to produce a stable lower solids emulsion upon dilution with water, and is essentially free of organic solvents.

As used herein, "water-continuous emulsion" refers to an emulsion having water as the continuous phase of the emulsion. Water-continuous emulsions are characterized by their miscibility with water and/or their ability to be diluted by the further addition of water.

The elastomeric polymers that can be used in the present invention are any polymers having a viscosity of 0.5–1,000,000 KPa-s and a glass transition temperature up to 50° C. One skilled in the art recognizes the term elastomeric to describe materials as having rubber-like properties or rubbery characteristics, that is, materials which can be extended to twice its own length at room temperature or having an elongation of 100% or higher at room temperature. When the term "polymer" is used herein, it should be understood to describe polymers that may be homopolymers, copolymers, terpolymers, and mixtures thereof.

For the purpose of this invention, the viscosity of the elastomeric polymer is defined as "zero-shear" viscosity at ambient temperature. This is commonly defined as the viscosity of a polymer when approaching zero shear rate conditions and is regarded as a constant value for a given polymer. The "zero-shear" viscosity is an approximated constant viscosity value derived empirically or from experimentally measured viscosity values.

The elastomeric polymers that can be emulsified by the process of the present invention can have a viscosity of 0.5 to 1,000,000 KPa-s, preferably the viscosity is 0.5 to 500,000 KPa-s, and most preferable is when the elastomeric polymer has a viscosity of 1.0 to 100,000 KPa-s. While the correlation of viscosity and molecular weight will vary depending on the specific type of polymer, generally the number average molecular weights (Mn) of the elastomeric polymers that can be typically used in the present invention range from 5,000 to 300,000 g/mole, preferably 5,000 to 200,000 g/mole, and most preferably range from 5,000 to 100,000 g/mole.

For purposes of this invention, the term "glass transition temperature" is the accepted meaning in the art, that is, the temperature at which a polymer changes from a brittle vitreous state to a plastic state. The glass transition temperature can be determined by conventional methods such as dynamic mechanical analyzer (DMA) and differential scanning calorimetry (DSC). The elastomeric polymers of the present invention should have a glass transition temperature of less than 50° C. Preferably, the elastomeric polymers of the present invention should have a glass transition temperature of less than 30° C., and more preferably, the elastomeric polymers should have a glass transition temperature of less than 0° C.

The elastomeric polymers which can be emulsified by the process of the present invention include, but are not limited to, those polymers typically associated with the following general classes of elastomeric materials such as; natural rubber, styrene-butadiene, butadiene, ethylene-propylene-diene polymers (EPDM), butyl rubber, nitrile rubber, chloroprene rubber, fluorocarbon elastomers, polysulfide rubbers, silicones, and polyurethane.

Elastomeric polymers can be further defined to encompass those materials that exhibit the ability to be extended to twice its own length at room temperature on its own, (hereafter referred to as "conventional elastomeric polymers"), or those materials that exhibit elastomer properties upon curing or crosslinking (hereafter referred to as "curable elastomeric polymers).

Illustrative examples of conventional elastomeric polymers include, but are not limited to: poly(olefins) and poly(olefins-dienes) copolymers, and their derivatives, that is, polymers and copolymers derived from olefinic monomers $C_2$ to $C_{12}$, dienes $C_4$ to $C_{12}$ such as, polyethylene, polypropylene, poly(butene-1), poly(propylethylene), poly (decylethylene), poly(dodecylethylene), poly(butylethylene), poly(ethylethylene), poly(ethyl-2-propylene), poly(isopropylethylene), poly(isobutylethylene), poly(isopentylethylene), poly(heptylethylene), poly(tert-butylethylene), poly(ethyele-co-propylene), poly(ethylene-propylene-diene) terpolymers (EPDM); polymers and copolymers of monoolefin, isomonoolefin and vinyl aromatic monomers, such as $C_2$ to $C_{12}$ monoolefins, $C_4$ to $C_{12}$ isomonoolefins, vinyl aromatic monomers including styrene, para-alkylstyrene, para-methylstyrene, (methods of preparing such polymers can be found in U.S. Pat. No. 5,162,445, and U.S. Pat. No. 5,543,484); poly(dienes) and derivatives; such as, polybutadiene, polyisoprene, poly(alkyl-butenylene) where alkyl can be a hydrocarbon group containing 1 to 12 carbon atoms, poly(phenyl-butenylene), polypentenylene, natural rubber (a form of polyisoprene), butyl rubber (copolymer of isobutylene and isoprene), illustrative commercial examples of polyisobutylenes suitable in the present invention are Oppanol B products from BASF (BASF, Ludwigshafen, Germany), Vistanex™ products from Exxon (Houston, Tex.), and Epion A products from Kaneka (Kanegafuchi Chemical Industry Co. Ltd. Tokyo, Japan and Kaneka America Corp, New York, N.Y.); halogenated olefin polymers; such as from the bromination of copolymers of isomonoolefin with para-methylstyrene to introduce benzylic halogen (as described in U.S. Pat. No. 5,162,445), halogenated polybutadienes, halogenated polyisobutylene such as Exxpro™ products from Exxon-Mobil (Houston, Tex.), poly(2-chloro-1,3-butadiene), polychloroprene (85% trans), poly(1-chloro-1-butenylene) (Neoprene™), chlorosulfonated polyethylene; polyurethanes and polyureas; such as elastomeric polyurethanes and polyureas prepared from a wide variety of monomeric diisocyanates (aliphatic diisocyanates such as hexamethylene diisocyanate, cyclohexyldiisocyanate; aromatic diisocyanates such as toluene diisocyanate (TDI), bis(methylene-p-phenyl) diisocyanate (MDI), isophorone diisocyanate (IPDI)), chain-extending diols, diamines, and oligomeric diols selected from polyether, polyester, polycarbonate, and polycaprolactam; poly(alkyl acrylates), and poly (alkyl methacryaltes), that is polymers and copolymers derived from alkyl acrylates and alkyl methacrylates such as poly(methyl acrylate), poly(ethyl acrylate), poly(butyl acrylate), poly(isobutyl acrylate), poly(2-ethylbutyl acrylate), poly(2-ethylhexyl acrylate), poly(n-octyl methacrylate), poly(dodecyl acrylate); copolymers and terpolymers of dienes, alkenes, styrenes, acrylonitriles, such as poly(butadiene-co-styrene), poly(butadiene-co-acrylonitrile), poly(butadiene-co-methyl metharyalte); poly(fluoroalkyl acrylates) that is polymers and copolymers derived from fluoro-containing acrylates and methacrylates such as polymer(fluoromethyl acrylate), poly(2,2,2-trifluoroethyl acryalte), poly(1H, 1H-pentfluoropropyl acryate), poly(1H, 1H,5H-octafluoropentyl acrylate); poly(vinyl ethers) and poly(vinyl thioethers) such as those polymers derived from butoxyethylene, sec-butoxyethylene, tert-butoxyethylene, alkyl vinyl ether, propoxyethylene, vinyl methyl ether (methoxyethylene), hexyloxyethylene, 2-ethylhexyloxy ethylene, butylthioethylene; poly(oxyalkylenes) such as poly(oxyethylene), poly(oxypropylene), poly(oxythylene-co-propylene); plasticizer compounded thermoplastics, that is thermoplastics having elastomeric behavior because of the addition of a plasticizers or other compatible additives, such as poly(vinyl chloride) compounded with dioctyl phthalate, tricresyl phophate, dibutyl sebacate, or poly(propylene adipate); fluoro elastomers and chloro-containing polymers derived from poly(alkylenes), poly(dienes) such as, poly(dichloroethyelene), poly(chlorofluoroethylene).

The elastomeric polymer can also be selected from curable elastomeric polymers, that is, the group of polymers exhibiting elastomeric behavior upon curing or crosslinking. Generally, curable elastomeric polymers are polymers having reactive groups contained therein that are able to crosslink during the curing process to yield an elastomeric polymer. Numerous reactive groups or crosslinking/cure mechanisms are well known in the art, and all are believed to be useful in the present invention, providing the resulting elastomeric polymer meets the glass transition temperature and viscosity limits described supra. Thus, the curable elastomeric polymers can be characterized by those conventional elastomeric polymers to which at least one reactive group or functional group is attached such as an alkenyl, vinyl, allyl, hydroxyl, carboxyl, epoxy, vinyl ether, alkoxy, silane, organosilane, or organosilyl group. The reactive-group or functional group may be attached at a terminal and/or pendant position on the polymer chain. These curable elastomeric polymers should maintain the structural integrity during the emulsification process and subsequently in the emulsion state. Upon water-removal, for example as in a coating application, the reactive-group or functional group cures to form a cured elastomeric polymer or coating of the elastomeric polymer. The curing may take place by merely drying off the water, or assisted by an external catalyst, heat, radiation, moisture, or in conjunction with an external curative.

The curable elastomeric polymers can be an alkenyl-functional elastomeric polymer where the alkenyl group is selected from a hydrocarbon group containing 2 to 12 carbons such as vinyl, allyl, propenyl, butenyl, hexenyl, etc. The elastomeric polymers bearing such alkenyl functional groups may be derived from most of the conventional elastomeric polymers, as described above, including poly(olefins) and poly(olefins-dienes) copolymers, and their derivatives: polymers and copolymers derived from olefinic monomers $C_2$ to $C_{12}$, dienes $C_4$ to $C_{12}$; polymers and copolymers of monoolefin, isomonoolefin and vinyl aromatic monomers: monoolefin $C_2$ to $C_{12}$, isomonoolefin $C_4$ to $C_{12}$, vinyl aromatic monomers including styrene, para-alkylstyrene, para-methylstyrene; examples include polymers derived from ethylene, propylene, isobutylene, isoprene, para-methylstyrene.

The curable elastomeric polymers can also be poly(dienes) and derivatives. Most of polymers, copolymers derived from dienes usually contain unsaturated ethylenic units on backbone or side-chains that are curable. Representative examples include polybutadiene, polyisoprene, polybutenylene, poly(alkyl-butenylene) where alkyl being $C_1$ to $C_{12}$, poly(phenyl-butenylene), polypentenylene, natural rubber (a form of polyisoprene); butyl rubber (copolymer of isobutylene and isoprene).

The curable elastomeric polymers can also be a halogenated olefin polymer. Representative examples of a halogenated olefin polymer include those polymers resulting from the bromination of a copolymer of isomonoolefin with para-methylstyrene to introduce benzylic halogen (as described in U.S. Pat. No. 5,162,445), halogenated polybutadienes, halogenated polyisobutylene, poly(2-chloro-1,3-butadiene), polychloroprene (85% trans), poly(1-chloro-1-butenylene) (Neoprene™), chlorosulfonated polyethylene. The brominated poly(isobutylene-co-para-methylstyrene) can be further cured via zinc oxide upon influence of heat.

The curable elastomeric polymers can also be polymers containing vinyl ether-, acrylate-, methyacrylate-, and epoxy-functional groups. Also, the elastomeric polymers can be hydroxyl terminal or hydroxy containing poly(oxyalkylenes) polymers, such as poly(oxyethylene), poly(oxypropylene), or poly(oxythylene-co-oxypropylene) polymers.

The elastomeric polymers can also be a silicon-modified elastomeric polymer.

The silicon-modified elastomeric polymers can be those conventional elastomeric polymers to which at least one silicon atom is attached via a silane, organosilane, organosilyl groups or a siloxane segment of various chain lengths. The silicon-containing units may be reactive or non-reactive and may be attached at the terminal and/or pendant positions on the polymer chain.

The silicon-modified elastomeric polymer can be selected from reactive silane group-containing elastomeric polymers, mixtures of reactive silane group-containing elastomeric polymers, blends of reactive silane group-containing elastomeric polymers with conventional elastomeric polymers, mixtures or blends of conventional elastomeric polymers with reactive silane group containing silicone polymers. The reactive silane groups may be attached at the terminal and/or pendant positions on the polymer chain and the total number of these reactive silicone groups may be varied to provide a cured elastomeric structure with desirable properties. Representative silane-modified elastomeric polymers are silyated polymers and copolymers derived from olefins, isomonoolefin, dienes, ethylene or propylene oxides, vinyl aromatic monomers from C2 to C12 such as the silane-grafted copolymers of isomonoolefin and vinyl aromatic monomer as discussed in U.S. Pat. Nos. 6,177,519 B1 and 5,426,167. Commerical products illustrative of silylated propylene oxide polymers are the MS Polymers from Kaneka (Kanegafuchi Chemical Industry Co. Ltd. Tokyo, Japan and Kaneka America Corp, New York, N.Y.). Other representative silicon-modified elastomeric polymers are illustrated by, but not limited to; alkenylsilyl-functional elastomeric polymers such as vinylsilyl-, allylsilyl-, hexenylsilyl-containing elastomeric polymers that are curable to form and further the elastomeric polymer structure; and alkoxysilyl-functional elastomeric polymers such as polymers containing at least one alkoxylsilyl groups and/or their hydrolysates selected from methoxysilyl, dimethoxysilyl, trimethoxysilyl, ethoxysilyl, diethoxysilyl, triethoxysilyl, and methoxyethoxylsilyl.

In a preferred embodiment of the present invention, the elastomeric polymer is selected from the silyated copolymers of an isomonoolefin and a vinyl aromatic monomer as described in U.S. Pat. No. 6,177,519 B1, which is hereby incorporated by reference. The silyated copolymers may be characterized as the addition product of an olefin copolymer radical created by contact of the copolymer with a free radical generating agent and an olefinically unsaturated, hydrolyzable silane wherein the silane adds to the polymer backbone to produce a silane grafted or silane modified copolymer product.

Illustrative examples of olefin copolymers suitable for modification with silanes to produce the preferred silyated copolymers of the present invention comprise copolymers containing at least 50 mole % of at least one $C_4$ to $C_7$ isomonoolefin and from 0.1 up to 50 mole % of at least one vinyl aromatic monomer. Preferred vinyl aromatic monomers are mono-vinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene. Suitable isomonoolefin monomers include isobutylene and the like. Preferably, 100% of the isomonoolefinic content of the copolymer comprises isobutylene. Preferred olefin copolymers include elastomeric copolymers comprising isobutylene and para-methylstyrene and containing from about 0.1 to 20 mole % of para-methylstyrene. These copolymers have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than about 5, more preferably less than about 3.5, a glass transition temperature ($T_g$) of below about −50° C. and a number average molecular weight (Mn) in the range of about 2,000 to 1,000,000, and even more preferably from 10,000 to 50,000.

Suitable unsaturated organic silanes which can be reacted with the olefin copolymer backbone to produce the preferred silylated copolymers of the present invention are of the general formula $RR'SiY_2$ wherein R represents a monovalent olefinically unsaturated hydrocarbon or hydrocarbonoxy radical reactive with the free radical sites produced on the backbone polymer, Y represents a hydrolyzable organic radical and R' represents an alkyl or aryl radical or a Y radical. Where R is a hydrocarbonoxy radical, it should be non-hydrolyzable. In the preferred embodiment R may be a vinyl, allyl, butenyl, 4-pentenyl, 5-hexenyl, cyclohexenyl or cyclopentadienyl radical, with vinyl being the most preferred radical. The group Y may be one or a mixture of $C_1$ to $C_4$ alkoxy radical such as methoxy, ethoxy or butoxy; Y may also be selected from acyloxy radicals such as formyloxy, acetoxy or propinoxy; oximo radicals such as —ON=C(CH$_3$)$_2$, —ON=C(CH$_3$)(C$_2$H$_5$) and —ON=C(C$_6$H$_5$)$_2$; or substituted amino radicals such as alkylamino or arylamino radicals, including —NHCH$_3$, —NHC$_2$H$_5$ and —NHC$_6$H$_5$ radicals. The group R' represents either an alkyl group, an aryl group or a Y group. The group R' can be exemplified by a methyl, ethyl, propyl, butyl, phenyl, alkylphenyl group or a Y group. Preferably, R' is a methyl or alkoxy group. The most preferred silanes are those where R' and Y are selected from methyl and alkoxy groups, e.g., vinyltriethoxysilane, vinyltrimethoxysilane and methyl vinyl dimethoxysilane.

Preferably, the free radical initiator used to create the preferred silylated copolymers of the present invention is an organic peroxide compound having a half-life, at the reaction temperature, of less than one tenth of the reaction/residence time employed.

The term "surfactant" is meant to describe a surface active agent selected from cationic surfactants, anionic surfactants, amphoteric surfactants, nonionic surfactants, and mixtures thereof which stabilizes the dispersed phase of the emulsion. Each of these types of surfactants, which are known in the art as being useful in stabilizing emulsions of elastomeric polymers, whether individually or combined with another type of surfactant, are also useful as a surfactant in the instant invention.

Suitable cationic surfactants include, but are not limited to, aliphatic fatty amines and their derivatives such as dodecylamine acetate, octadecylamine acetate and acetates of the amines of tallow fatty acids; homologues of aromatic amines having fatty chains such as dodecylanalin; fatty amides derived from aliphatic diamines such as undecylimidazoline; fatty amides derived from disubstituted amines such as oleylaminodiethylamine; derivatives of ethylene diamine; quaternary ammonium compounds such as tallow trimethyl ammonium chloride, dioctadecyldimethyl ammonium chloride, didodecyldimethyl ammonium chloride and dihexadecyldimethyl ammonium chloride; amide derivatives of amino alcohols such as beta-hydroxyethylsteraryl amide; amine salts of long chain fatty acids; quaternary ammonium bases derived from fatty amides of disubstituted diamines such as oleylbenzylamino-ethylene diethylamine hydrochloride; quaternary ammonium bases of the benzimidazolines such as methylheptadecyl benzimidazole hydrobromide; basic compounds of pyridinium and its derivatives such as cetylpyridinium chloride; sulfonium compounds such as octadecylsulfonium methyl sulfate; quaternary ammonium compounds of betaine such as betaine compounds of diethylamino acetic acid and octadecylchloromethyl ether; urethanes of ethylene diamine such as the condensation products of stearic acid and diethylene triamine; polyethylene diamines; and polypropanolpolyethanol amines.

Suitable anionic surfactants include, but are not limited to sulfonic acids and their salt derivatives such as described in U.S. Pat. No. 3,294,725 to Findley et al., which patent is hereby incorporated by reference. These anionic surfactants can be exemplified by, but are not limited to, alkali metal sulforicinates; sulfonated glycerol esters of fatty acids such as sulfonated monoglycerides of coconut oil acids; salts of sulfonated monovalent alcohol esters such as the sodium salt of oleylic acid isethionate; amides of amino sulfonic acids such as the sodium salt of oleyl methyl tauride; sulfonated products of fatty acids nitriles such as palmitonitrile sulfonate; sulfonated aromatic hydrocarbons such as sodium alphanaphthalene monosulfonate and dibutyldodecylbenzenesulfonate (DBSA); condensation products of naphthalene sulfonic acids with formaldehyde; sodium octahydroanthracene sulfonate; alkali metal alkyl sulfates, such as sodium lauryl sulfate; ether sulfates having alkyl groups of 8 or more carbon atoms, alkylarylsulfonates having 1 or more alkyl groups of 8 or more carbon atoms and dialkylsulfonates, each alkyl group having 8 or more carbon atoms, such as dioctyl sulfosuccinate.

Suitable amphoteric surfactants include, but are not limited to, lecithin, glycinates, betaines, sultaines and alkyl aminopropionates. These can be exemplified by cocoamphglycinate, coco-amphocarboxyglycinates, cocoamidopropylbetaine, lauryl betaine, cocoamido-propydroxy-sultaine, laurylsulataine, and cocoamphodipropionate.

Useful nonionic surfactants may be exemplified, but not limited to, polyoxyalkylene alkyl ethers, polyoxyalkylene sorbitan esters, polyoxyalkylene alkyl esters, polyoxyalkylene alkylphenyl ethers, ethoxylated amides, ethoxylated amines, ethoxylated siloxanes, polyvinylacetate hydrolysate, polyvinylalchohol, polyglycerols, and block copolymers of propylene oxide and ethylene oxide and others. When nonionic surfactants are used in the present invention, polyoxyalkylene alkyl ethers are preferred. Representative examples of commercial polyoxyalkylene alkyl ethers, include Brij 30®, Brij 35L®, and Brij 97® produced by Uniqema (ICI Surfactants, Wilmington, Del.) and mixtures thereof.

The surfactant can also be selected from the reaction products resulting from the reaction between a carboxylic acid functional hydrocarbon group and an amine functional hydrocarbon. The carboxylic acid functional hydrocarbon can be any hydrocarbon having a carboxylic acid group present in the molecule. The carboxylic acid functional hydrocarbon can be a linear or branched hydrocarbon, saturated or unsaturated, containing at least 4 carbon atoms in the molecule. Suitable carboxylic acid functional hydrocarbons include, but not limited to; monoprotic acids of the general formula RCOOH, where R represents a linear or branched hydrocarbon of containing 4 to 36 carbon atoms; ester containing monoprotic acids, such as adipic acid monoethyl ester, azelaic acid monomethyl ester; dimer acids, such as azelaci acid; trimer acids, such as the oligomeric product of unsaturated linear carboxylic acid containing at least 12 carbons, for example Empol 1043 (trimer acid of tall oil) or Empol 1045 (trimer acid of olelic acid) from Cognis Corporation (Cincinnati, Ohio). Preferably the carboxylic acid functional hydrocarbon is selected from the group of carboxylic acids commonly known as "fatty acids", that is, carboxylic acids derived from or contained in an animal or vegetable fat or oil. The fatty acids can be either saturated or unsaturated. Representative examples of fatty acids include, but not limited to; lauric, palmitic, stearic, isostearic acid, tall oil, oleic, linoleic, and linolenic. Most preferably, the carboxylic acid functional hydrocarbon is selected from fatty acids that are liquid at room temperature.

The amine functional hydrocarbon can be any hydrocarbon containing amine functionality within its molecule. Hydrophilic amine functional hydrocarbons are preferred, that is amine functional hydrocarbons that have some miscibility with water. Suitable hydrophilic amine functional hydrocarbons include, but not limited to; primary alcohol amines, such as ethanolamine; secondary amine alcohols such as diethanolamine; tertiary amine alcohols, such as triethanol amine; polyamines with hydrophilic groups such as polyethylene oxide groups. Preferably the hydrophilic amine functional hydrocarbon is a secondary amine alcohol, most preferably the hydrophilic amine functional hydrocarbon is diethanolamine.

The carboxylic acid functional hydrocarbon and amine functional hydrocarbon can be reacted together in any manner, but preferably they are reacted together prior to mixing with the elastomeric polymer to form the premix. The temperature and pressure at which the reaction step occurs is not critical, but generally is conducted at temperatures of 20 to 120° C., preferably 40 to 80° C., and at atmospheric pressure. The molar ratio of the carboxylic acid functional hydrocarbon to the amine functional hydrocarbon can vary, but typically is in the range of 3 to 0.33, preferably 2 to 0.5, and most preferably 1.5 to 0.8.

Generally, the amount of surfactant used should be that amount which stabilizes the emulsion of the elastomeric polymer. An amount from 3 to 30 parts by weight based on 100 parts by weight elastomeric polymer should be sufficient. Preferably, the surfactant is present in an amount from 5 to 15 parts by weight based on 100 parts by weight elastomeric polymer. More preferably, the surfactant is present in an amount from 5 to 10 parts by weight based on 100 parts by weight elastomeric polymer.

The elastomeric polymer and surfactant are mixed in the absence of solvents to form a premix. As used herein, the phrase "essentially free of organic solvents" means that solvents are not added to the elastomeric polymer and surfactant premix in order to create a mixture of suitable viscosity that can be processed on typical emulsification devices. More specifically, "organic solvents" as used herein is meant to include any water immiscible low molecular weight organic material added to the non-aqueous phase of an emulsion for the purpose of enhancing the formation of the emulsion, and is subsequently removed after the formation of the emulsion, such as evaporation during a drying or film formation step. Thus, the phrase "essentially free of organic solvent" is not meant to exclude the presence of solvent in minor quantities in process or emulsions of the present invention. For example, there may be instances where the elastomeric polymer or surfactant used in the premix composition contains minor amounts of solvent as supplied commercially. Small amounts of solvent may also be present from residual cleaning operations in an industrial process. Furthermore, small amounts of solvent may also be added to the process of the present invention for purposes other than to enhance the formation of the water-continuous emulsion. Preferably, the amount of solvent present in the premix should be less than 5% by weight of the premix, more preferably the amount of solvent should be less than 2% by weight of the premix, and most preferably the amount of solvent should be less than 1% by weight of the premix.

Illustrative examples of "organic solvents" that are included in the above definition are relatively low molecular weight hydrocarbons having normal boiling points below 200° C., such as alcohols, ketones, ethers, esters, aliphatics, alicyclics, or aromatic hydrocarbon, or halogenated derivatives thereof.

As merely illustrative of solvents to be included in the definition of "organic solvents", there may be mentioned butanol, pentanol, cyclopentanol, methyl isobutyl ketone, secondary butyl methyl ketone, diethyl ketone, ethyl isopropyl ketone, diisopropyl ketone, diethyl ether, secbutyl ether, petroleum ether, ligroin, propyl acetate, butyl and isobutyl acetate, amyl and isoamyl acetate, propyl and isopropyl propionate, ethyl butyrate, pentane, hexane, heptane, cyclopentane, cyclohexane, cycloheptane, methylene chloride, carbon tetrachloride, hexyl chloride, chloroform, ethylene dichloride, benzene, toluene, xylene, chlorobenzene, and mixtures thereof with each other and/or more water soluble solvents.

A plasticizer (D) may be added as an optional component to the premix. As used herein, "plasticizer" is meant to describe any additive to the premix added for the purpose of enhancing the mixture of the surfactant with the elastomeric polymer. Generally, the plasticizer should be compatible and miscible with the elastomeric polymer and has one or more of the following effects on the elastomeric polymer: reduces the viscosity of polymer, renders the polymer flexible and easier to process, lowers the softening temperature, or increases the melt-flow characteristics. Addition of plasticizer is usually intended to reduce the viscosity and rigidity, and enhance the processing of the polymer.

Generally, the plasticizer can be selected from saturated or unsaturated hydrocarbons containing at least 8 carbon atoms. Illustrative examples of plasticizers useful in the present invention include, but are not limited to: alkanes, for example straight, branched, or cyclic aliphatic hydrocarbons having the formula $C_nH_{2n+2}$; alkenes and alkynes; for example, unsaturated hydrocarbons having chain length of at least C8, aromatic hydrocarbons, including alkylaryl hydrocarbons: cycloparaffinic compounds and varieties of aromatic- and naphthenic-containing compounds; halogenated alkanes or halogenated aromatic hydrocarbons: such as chlorinated, brominated derivatives of alkanes, halogenated aromatic or alkylaryl hydrocarbons, alkanes or aromatic hydrocarbons in which some of the hydrogens are replaced by halogens such as chlorine, or bromine atoms; esters of carboxylic acids and phosphoric acids: such as isodecyl pelargonate, dibutyl phthalate, dioctyl phthalate, diisodecyl phthalate, diisooctyl adipate, diisodecyl adipate, butyl benzyl phthalate; phosphates and polyesters: such as low to moderate molecular weight esterification products from acids, anhydrides, diacids, phosphates such as 2-ethylhexyl diphenyl phosphate, tricresyl phosphate, cresyl diphenyl phosphate; low and moderate molecular-weight elastomeric polymers or oligomers, such as oligomeric materials or low to moderate molecular-weight polymers of similar structure to the elastomeric polymers exhibit excellent miscibility and compatibility with the elastomeric polymers, for example, low molecular weight polyisobutylene, and polybutene as plasticizer for polyisobutylene or poly (isobutylene-co-p-methylstyrene) elastomers; Polyglycols, Polyols, polyalkyl glycols, polyalkylene glycols, ethers, and glycolates: such as butyl phthalyl butyl glycolate, methyl phthalyl ethyl glycolate; Sulfonamides and cyanamides: such as cyclohexyl-p-toluene-sulfonamide, N-ethyl-p-toluenesulfonamide, p-toluenesulfonamide: Hydrophilic plasticizers, such as polyvinyl alcohol, poly(vinyl acetate) and partially hydrolyzed; Terpene hydrocarbons such as terpentine, pinene, dipentene, terpineol, pine oil.

Generally, the plasticizer is selected from compounds having a chemical structure that is similar to the chemical structure of the elastomeric polymer to be emulsified. For example, saturated hydrocarbons such as mineral oil, or low molecular weight isobutylenes would be preferred plasticizers when the elastomeric polymer is a polyisobutylene.

The amount of plasticizer added to the premix can vary, but generally ranges from 0.1 to 100 parts by weight to 100 parts of the elastomeric polymer, preferably 0.1 to 50, and most preferably ranges from 0.1 to 30 parts by weight to 100 parts of the elastomeric polymer.

A low molecular weight acid (E) can also be added to the premix as an optional component. The addition of the low molecular weight acid is preferable when a silylated copolymer of isomonoolefin and a vinyl aromatic monomer is used as the elastomeric polymer to be emulsified, and in particular when the silylated group comprises an alkoxy group. Although not to be limited by any theory, the present inventors believe the low molecular weight acid helps to minimize hydrolysis of the alkoxy silane present on the copolymer during the emulsification process.

The water-continuous emulsions of the elastomeric polymer can be characterized as having an average particle size distribution of less than 5 µm (micrometers), with a solids content of greater than 75%, and are able to produce stable water-continuous emulsions upon further dilution with water. Average particle size distribution is the accepted meaning in the art, and can be determined for example using a Malvern Mastersizer unit. "Solids content" is also the accepted meaning in the art, that is the weight percent of all non-aqueous components added to the emulsion. For purposes of this invention, "stable water-continuous emulsion" means that the emulsion's average particle size distribution does not change substantially within a given period of time, for example the average particle size remains less than 5 µm and no significant formation of particles larger than 5 µm occurs within a time period of 4 months. Thus, mixing additional water to the high solids content water-continuous phase emulsion forms a diluted emulsion having stability of at least 4 months. The water-continuous emulsions of elastomeric polymers having a solids content greater than 75% can be diluted to water-continuous emulsions having a solids content as low as 5%, preferably the solids content upon dilution is 5 to 30% and most preferably from 30 to 75%.

Illustrative, non limiting examples of low molecular weight acids suitable in the present invention are: inorganic acids such as hydrochloric acid, sulfuric acid, phosphoric acid, and the like; and also organic acids such as carboxylic acid functional hydrocarbons containing 1 to 8 carbon atoms, for example, formic acid, acetic acid, propionic acid, maleic acid, fumaric acid, and the like. Preferably the low molecular weight acid is acetic acid.

The amount of low molecular weight acid added to the premix can vary, but generally ranges from 0.001 to 10 parts by weight to 100 parts of the elastomeric polymer, preferably, 0.001 to 5, and most preferably ranges from 0.001 to 3 parts by weight to 100 parts of the elastomeric polymer.

The present invention also relates to processes for preparing a water-continuous emulsion of an elastomeric polymer. In a first embodiment, the process comprises the steps of:

(I) forming a premix comprising;
  (A) 100 parts of an elastomeric polymer having a viscosity of 0.5 to 1,000,000 KPa-s and a glass transition temperature up to 50° C.,
  (B) 3 to 30 parts of a surfactant, wherein the premix is essentially free of organic solvents,
(II) adding
  (C) 5 to 45 parts water to the premix with mixing thereby forming a water-continuous emulsion of the elastomeric polymer having a solids content of greater than 75%, an average particle size less than 5 μm, and having sufficient stability to produce a stable lower solids emulsion upon dilution with water.

The elastomeric polymer, surfactant, plasticizer, and low molecular weight acid are the same as defined above. Also, the phrase "essentially free of organic solvents" is the same as defined above.

The formation of the premix in step (I) comprising the elastomeric polymer, surfactant, optional plasticizer, and optional low molecular weight acid can be accomplished by any method known in the art to effect mixing of high viscosity materials. The mixing of the premix components can occur either as a batch, semi-continuous, or continuous process whereby the mixing is provided by means known in the art to mix high viscosity materials, for example, batch mixing equipments with medium/low shear include change-can mixers, double-planetary mixers, conical-screw mixers, ribbon blenders, double-arm or sigma-blade mixers; batch equipments with high-shear and high-speed dispersers include those made by Charles Ross & Sons (NY), Hockmeyer Equipment Corp. (NJ); batch equipments with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, corotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipments. Furthermore, one may be able to mix elastomeric polymers of relatively low viscosity in such conventional emulsification equipments as rotor-stator, colloid mills, homogenizers, and sonolaters.

The temperature and pressure at which the mixing occurs to effect the formation of the premix is not critical, but generally is conducted at ambient temperature and pressures. Typically, the temperature of the mixture will increase during the mixing process due to the mechanical energy associated with shearing such high viscosity materials. Thus, lower shear rates will cause less of a temperature increase. Preferably the temperature is controlled to be below 60° C. to minimize undesirable side reactions.

The temperature increase in the mixture will also depend on the type of mixing equipment used, high shear mixing generally results in high temperature build up. Also, the longer durations of mixing time will result in greater temperature increases. While the temperature of the operation is not necessarily critical for forming emulsions of conventional elastomeric polymers, in other instances it may be desirable to control the temperature to be below 60° C. Therefore, the preferred mixing equipments for forming the premix of the elastomeric polymers are those batch equipments with medium to low shear rate such as Double-planetary mixers, low intensity, low-shear rate change-can mixers, and batch mixers equipped with high viscosity mixing capability or blades; and the preferred continuous mixers include twin-screw extruders, corotating or counter-rotating, single, two- or multi-stage extruders where the mixing times are relatively short.

The second step of the process involves adding 5 to 45 parts water to the premix with mixing to form a water-continuous emulsion of the elastomeric polymer having an average particle size less than 5 μm and having sufficient stability to produce a stable lower solids emulsion upon dilution with water.

The amount of water added can vary from 5 to 45 parts per 100 parts by weight of the premix. The water is added to the premix at such a rate so as to form a stable high solids emulsion of the elastomeric polymer. While this amount of water can vary depending on the selection of the elastomeric polymer and surfactant, generally the amount of water is from 5 to 45 parts per 100 parts by weight of the premix, and more preferably is from 5 to 30 parts per 100 parts by weight of the premix, and most preferably is from 5 to 20 parts per 100 parts by weight of the premix.

It is preferred in this embodiment that the water is added to the premix in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the elastomeric polymer. The present inventors have unexpectedly found this stepwise addition of water in small incremental portions allows for the formation of the emulsion and greatly enhances the emulsion stability at relatively high solids contents. Each incremental addition of water is added to the premix and dispersed. Before adding the next incremental portion of water, the previous incremental portion should have been dispersed, meaning that no visible water droplets were present in the mixture. Preferably, the successive incremental portion of water comprises less than 4 weight % of the premix, and most preferably comprises less than 2 weight % of the premix.

Although not to be limited by any theory, the present inventors believe the total amount of water added in incremental portions, according to the preferred embodiment of the present invention, represents the amount of water necessary to cause a phase inversion from a non-aqueous continuous mixture to a water-continuous emulsion. This point is evidenced by the physical changes of the mixture that accompany this particular stage of the process. These physical changes include the emulsion's ability to be readily diluted in water, and also the creamy/lustrous appearance of the water-continuous emulsion.

Water is added to the premix with mixing to form the water-continuous emulsion of the elastomeric polymer. The mixing methods in step (II) can be accomplished by the same or different mixing methods as in step (I). Preferably, the mixing methods for the water addition in step (II) is the same as the mixing methods used to form the premix in step (I).

Illustrative of the batch mixers and conditions that can be used to accomplish the mixing of the water with the premix in step (II), or premix formation of step (I) of the present invention include but are not limited to: Ross mixers with HV blades (Charles Ross & Sons, NJ), a low speed, high power mixing device operating at a very low shear rate of 1 sec−1 to 7 sec−1 (10 rpm–70 rpm); Ross Powermix, a mixing and compounding device having two mixing blades, one scraper blade operating a low shear rate of 2.4 sec−1 to 7 sec−1 (24–70 rpm) and a high speed disperser delivering a shear rate range of 115–345 sec−1 (1150–3450 rpm); Turello mixer (Turello Manufacturer: Construzioni Meccaniche, Zona Artigianale, Via Dei Ponti, Spilimbergo), a mixing and compounding device having two mixing blades, one mixing blade operating at a low shear rate of 2 sec−1 to 6 sec−1 (20–60 rpm), and the other two high speed dispersers delivering a shear rate range of 30 sec$^{-1}$ to 310 sec−1 (300 rpm to 3000 rpm); Hauschild mixer, (Hauschild universal mixer: Hauschild mixer, model AM 501, Waterkamp 1, 59075 Hamm, Germany; supplied through Flacteck, Landrum S.C.) a rotational mixing device operating at a fixed shear rate of 1032 sec−1 or 3000 rpm. The mixing methods used in step (II), or premix formation of step (I) of the present invention can also be accomplished by a continuous process such as an extruder. A twin screw co-rotating fully inter-meshing extruder, 2-lobe, 3-lobe, or greater screw elements (multi-lobe elements) with high length to diameter (L/D) is particularly useful for the process of the present invention because of its flexibility in allowing multiple additions of water at controlled quantities at selected locations and its ability to effectively disperse water quickly via dispersive and shear mixing.

When a twin screw co-rotating extruder is used for mixing in the present invention, sufficient mixing can be accomplished through screw configuration design, selection of water injection ports along the extruder, and the control of screw operating conditions. An effective screw configuration suitable for continuous emulsification process requires choices of screw elements and proper configuration of such screw elements in such order that the completed screw configuration may cause desirable dispersion and distribution of water into the premix. There are many commercially available screw elements which may be selected for constructing a useful screw configuration. Illustrative examples of such screw elements include; medium/wide discs kneading blocks for dispersive shearing mixing, screw mixing elements and turbine mixing elements for mixing action, and screw bushings for conveying purposes. There are many variations among each type of screw elements. For example, there are wide discs, medium discs, thin discs, and discs in neutral, right handed and left handed directions for the kneading blocks type alone, and 2-lobe or 3-lobe screw elements. For those skilled in the art, it should be obvious that by properly combining different type of screw elements and in certain orders one can devise screw configurations to perform desirable shear and mixing means at specific segments of the extruder. One skilled in the art can further develop a process where low viscosity surfactants and water may be incorporated into the elastomeric polymer at selected injection ports along the extruder where the water and surfactants may be effectively dispersed prior to the next water injection, to provide the preferred amounts and rates of water addition in accordance with the present invention.

The temperature and pressure at which the water addition step (II) occurs is not critical, but preferably mixing is conducted at ambient temperature and pressures. Typically, the temperature of the mixture will increase during the mixing process due to the mechanical energy associated with shearing such high viscosity materials. Thus, lower shear rates will cause less temperature increases. The temperature increase in the mixture will also depend on the type of mixing equipment used, high shear mixer generally results in high temperature build up, so does the longer the mixing time. While the temperature of the operation is not necessarily critical for conventional elastomeric polymers, it is important to keep the temperature build-up low during the mixing. Preferably the temperature for the water mixing is controlled to be below 60° C. Therefore, the preferred mixing equipments for forming the emulsions of the elastomeric polymers are those batch equipments with medium to low shear rate such as Double-planetary mixers, low intensity, low-shear rate change-can mixers, and batch mixers equipped with high viscosity mixing capability or blades; and the preferred continuous mixers include twin-screw extruders, co-rotating or counter-rotating, single, two- or multi-stage extruders where the mixing times are relatively short.

In a second embodiment, the present invention relates to a process for preparing a water-continuous emulsion of an elastomeric polymer comprising the steps of:

(I) forming a premix comprising;
    (A) 100 parts of an elastomeric polymer having a viscosity of 0.5 to 1,000,000 KPa-s and a glass transition temperature up to 50° C.,
    (B) 3 to 30 parts of a surfactant,
(II) adding
    (C) 5 to 45 parts water to the premix with mixing thereby forming a water-continuous emulsion of the elastomeric polymer having a solids content of greater than 75%, an average particle size less than 5 µm, and having sufficient stability to produce a stable lower solids emulsion upon dilution with water, wherein the water is added to the premix in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the elastomeric polymer.

In this second embodiment of the process of the present invention, the water is added to the premix in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the elastomeric polymer. The present inventors have unexpectedly found this stepwise addition of water in small incremental portions allows for the formation of the emulsion and greatly enhances the emulsion stability at relatively high solids contents. Each incremental addition of water is added to the premix and dispersed. Before adding the next incremental portion of water, the previous incremental portion should have been dispersed, meaning that no visible water droplets were present in the mixture. Preferably, the successive incremental portion of water comprises less than 4 weight % of the premix, and most preferably comprises less than 2 weight % of the premix.

Other optional ingredients may be added to the water continuous emulsions of the present invention as desired to affect certain performance properties, providing the nature and/or quantity of these optional ingredients does not substantially destabilize the water-continuous emulsions of the present invention. These optional ingredients include, fillers, freeze-thaw additives such as ethylene glycol or propylene glycol, antimicrobial preparations, UV filters, pigments, dyes, and perfumes.

The emulsions of the present invention are useful in coating applications requiring no or little presence of organic solvents. In particular, the emulsions of the present invention are useful in those coating applications requiring flexible film formation with improved water resistance or gas/vapor permeability.

EXAMPLES

The following examples are presented to further illustrate the compositions and methods of this invention, but are not to be construed as limiting the invention, which is delineated in the appended claims. All parts and percentages in the examples are on a weight basis and all measurements were obtained at about 23° C., unless indicated to the contrary.

The particle size of the emulsion was determined using a Malvern Mastersizer S unit. The unit was equipped with 300RF mm range lens capable of detecting a particle size range from 0.05 μm to 900 μm. The data was analyzed using a polydisperse model and calculated per the Fraunhofer model. The results from these measurements are reported herein as;

D(v, 0.5), the size value of particle at which 50% of the sample is smaller and 50% is larger than this value. This value is defined as the average particle size of the emulsion sample in this invention, also known as the mass median diameter.

D(v, 0.9), the size value of particle for which 90% of the sample is below this size.

Span, the measurement of the width of the distribution. It is calculated as the ratio of the difference between D(v, 0.9) and D(v, 0.1) to D(v, 0.5). The smaller the value, the narrower the particle size distribution.

The "zero-shear" viscosity of elastomeric polymers in this invention were either experimentally derived or adopted from available commercial literatures. To derive the zero-shear viscosity of an elastomeric polymer, the apparent viscosity of the elastomer at different shear rates (1/sec) or angular frequencies (rad/sec) were measured on a shear stress rheometer at 25° C. A CSL 500 Rheometer from TA Instruments Inc., (New Castel, Del.) (also known under Cari-Med Rheometer) was used to carry out the measurements. A variety of sample geometries were used to in order to carry out the viscosity measurements. For high viscosity polymers, cone and plate and parallel plate at selected diameters were used. For example, the 2 cm diameter cone and plates were used for very high viscosity polymers and the 6 cm diameter cone and plates for moderately low viscosity polymers. The cone and plate was used for homogeneous materials and emulsions with sub-micrometer (μm) particles, and parallel plate geometry was used for particulate containing or multi-component mixtures. Additionally, the cone and plate geometry was used for highly shear rate sensitive materials.

When an extruder was used for mixing and forming the emulsions, a modular 25 mm co-rotating, fully intermeshing twin-screw extruder manufactured by Krupp Werner & Pfleiderer Corporation (Ramsey, N.J.) was used. The extruder was powered by a 21.5 KW AC motor with a Flux Vector Drive capable of generating screw speeds of up to 1200 rpm. The diameter of each screw was 25 mm and the channel depth was 4.15 mm. The free space cross sectional area was 3.2 $cm^2$. The overall length to diameter ratio L/D of the machine was 56:1. The extruder module had 14 barrels with one injection port on each barrel. The polymer was fed to the extruder via a single screw Bonnot Extruder and the screw was tapered to ensure accurate flow control and delivery. Additives, surfactants, acid, and water were delivered to the extruder via precision pumps and flow control valves to selected ports on the extruder.

Example 1

Four high solids water-continuous emulsions of various silylated copolymers of isobutylene and methyl styrene (Si PIB) polymers were prepared. The Mn, Mw, % Si, and viscosities of these four silylated PIB polymers are summarized in Table 1. These silylated PIB polymers were prepared according to the procedures detailed in U.S. Pat. No. 6,177, 519.

The following general procedure was used for Runs 1–4. The compositions and resulting emulsion properties for Runs 1–4 are summarized in Table 1.

A 1 gallon Ross mixer equipped with double planetary mixer blades was charged with 2500 g of a dimethoxymethylsilyl-functional poly(isobutylene-co-paramethylstyrene) and heated at 50° C. for 2 hours. Then, 375 g of a hydrocarbon oil, Daphne KP-100 (formula weight 490 g/mole, Apollo America Corp.) was added with at an agitation speed of about 15–25 rpm (about a shear rate of 1.5 to 2.5 sec−1) and mixed for 2 hours to produce a homogeneous mixture. To this mixture was added a mixture of 80 g of Brij 30, 120 g of Brij 35L (@ 72% solids), 120 g of Brij 97, (ICI Surfactants, Uniqema, Wilmington, Del.) and 7.5 g of acetic acid at a mixing speed of 15–25 rpm until a homogeneous polymer/surfactants mixture (premix) was obtained (typically after an additional 2 hours of mixing).

The prepared polymer/surfactants mixture (premix) was transferred to a 10 liter Turello mixer. No heat was applied. The agitator/scraper was started at about 30 rpm and the high speed disperser was started at about 500 rpm (about 50 sec−1 shear rate). An initial 50 g of de-ionized water was gradually added to the mixture while mixing. This amount of water corresponded to about 1.5 wt. % of the polymer/surfactants mixture (premix). Next, 50 g of de-ionized water was incorporated only after the previous water was fully incorporated, that is there were no visible water droplets in the mixture. The high speed disperser was adjusted between 1000 rpm (about 105 sec−1 shear rate) to near 2800 rpm (about 295 sec−1 shear rate) to ensure a effective and homogeneous dispersion. A total of 525 g water was incorporated in 50 g increments, with the last increment being 25 g, to produce a water-continuous emulsion, as evidenced by its miscibility with water.

All four runs produced water-continuous emulsions having excellent shelf and aging stability. All the emulsions exhibited no significant change after 4 months of aging, rather they remained smooth, creamy and water-dilutable. The particle size measurements for the 4 month aged samples are also summarized in Table 1.

TABLE 1

| SiPIB polymer property | Run 1 | Run 2 | Run 3 | Run 4 |
|---|---|---|---|---|
| % pMS in SiPIB | 5 | 8 | 5 | 8 |
| Polymer viscosity, poise | 1,500,000 | 1,800,000 | 615,000 | 1,800,000 |
| Si % | 1.17 | 2.35 | 1.53 | 2.35 |
| Mw, g/mole | 63,790 | 76,600 | 44770 | 76,600 |
| Mn, g/mole | 31,870 | 30,640 | 26820 | 30,640 |
| Si-grafted PIB polymer | 2500 | 2500 | 2500 | 2500 |
| KP-100 | 375 | 375 | 375 | 250 |
| Isostearic acid (Emersol 873) | | | | 250 |
| Brij 30 | 80 | 80 | 80 | |
| Brij 35L (@ 72% solids) | 120 | 120 | 120 | 250 |
| Brij 97 | 120 | 120 | 120 | 125 |
| Acetic acid | 7.5 | 7.5 | 7.5 | 7.5 |
| Water, de-ionized | 525.0 | 515.0 | 515.0 | 825.0 |
| % Solids (actual) | 85.7 | 86.0 | 86.0 | 80.0 |
| Particle size profile Malvern, initial | | | | |
| D(v, 0.5), μm | 0.63 | 0.6 | 0.57 | 0.56 |
| D(v, 0.9), μm | 1.58 | 1.32 | 1.67 | 1.66 |
| Span | 2.14 | 1.80 | 2.63 | 2.64 |
| Malvern, 4-month aging | | | | |
| D(v, 0.5), μm | 0.608 | 0.558 | 0.572 | 0.515 |
| D(v, 0.9), μm | 1.49 | 1.22 | 1.63 | 1.5 |
| Span | 2.1 | 1.8 | 2.52 | 2.55 |

Example 2

Five high solids emulsions were made in a lab-scale Hauschild mixer using the following general procedure. In these runs, the same polymer and surfactants were used, but the amount of water added in incremental portions was varied. The polymeric elastomer was a dimethoxymethylsilyl-functional poly(isobutylene-co-paramethylstyrene), prepared according to the procedures detailed in U.S. Pat. No. 6,177,519. The polymer had a viscosity 180,000 Pa.s (1,800,000 poise), 2.35% Si content, 8% paramethylstyrene units in the copolymer, and Mw of 76,600 g/mole, and Mn of 30,640 g/mole.

First, 40.0 g of the dimethoxymethylsilyl-functional poly(isobutylene-co-paramethylstyrene) was weighed into a clean plastic container. The material was pre-heated to 50 C for about 2 hours. Then 6.0 g of a petroleum hydrocarbon oil, Daphne KP-100 (formula weight of 490 g/mole, Apollo America Corp.) was added to the polymer. The mixture was spun in Hauchild mixer to homogeneous, typically 100 seconds at a revolving/rotating motion at a speed of 3000 rpm (or shear rate of 1150 sec−1). Then the following surfactants and acid were incorporated into the polymer mixture: 0.8 g of Brij 30 (POE (4) Lauryl ether, HLB 9.5, Uniqema), 1.20 g of Brij 97 (POE(10) Oleyl ether, HLB 12.4, Uniqema), and 1.70 g of Brij 35L (72% solids, POE(23) Lauryl ether, HLB 16,9, Uniqema), and 0.12 g of acetic acid. The mixture was spun in Hauschild mixer for additional 75 seconds to homogeneous.

In Run # 5, 0.5 g of de-ionized water per addition was used. This was about 1.0 wt. % of the polymer/surfactants solids. The water was spun for at 60 seconds at the fixed speed of about 3000 rpm (or a shear rate of about 1150 sec−1) to thoroughly disperse the water. The next addition of 0.5 g water was incorporated, and spun mixed to uniform state. It was observed that a smooth, creamy, water-continuous emulsion was obtained only after 4.8 wt. % water was incorporated. This water-continuous emulsion had a high solids content of 95.2% by weight. The emulsion had an average particle size D(v, 0.5) of 0.479 micrometers, D(v, 0.9) of 1.37 micrometers and a span of 2.48. Additional water was added to dilute the emulsion to about 85 wt. % solids. The final emulsion has an average particle size D(v,0.5) of 0.463 micrometers, D(v,0.9) of 1.40 micrometers, and a span of 2.62.

Runs 6–9 varied the amount of water used in each addition, from 1.0 g per addition (equivalence of 2.0 wt. % per polymer/surfactants) in run #6 to 8 g per addition (equivalence of 16.0 wt. % per polymer/surfactants) in Run # 9. As summarized in the Table 2, Run # 9 produced an emulsion having large and broad particle size and a bi-modal profile. This emulsion had less than 4 weeks stability in storage. The emulsion produced in Run # 8 had good average particle size, but with large particles up to 10 micrometers size. This emulsion also deteriorated over time.

These results demonstrate the rate of water addition as having an impact on the quality and stability of emulsion.

TABLE 2

| | Run # | | | | |
|---|---|---|---|---|---|
| | 5 | 6 | 7 | 8 | 9 |
| Wt. % water per addition | 1.0% | 2.0% | 4.0% | 8.0% | 16.0% |
| Amount water per addition | 0.5 g/addition | 1 g/addition | 2 g/addition | 4 g/addition | 8 g/addition |
| Wt. % solids at inversion point | 95.2 | 95.2 | 95.2 | 91.7 | 85.4 |
| Emulsion particle profile at inversion point | 0.479 μm; 1.37 μm; 2.48 | 0.494 μm; 1.34 μm; 2.33 | 0.551 μm; 1.46 μm; 2.29 | 0.604 μm; 1.69 μm; 2.45 | 0.743 μm; 5.12 μm; 6.61 (bi-modal) |
| Final emulsion at 85% solids | 0.463 μm; 1.40 μm; 2.62 | 0.506 μm; 1.35 μm; 2.28 | 0.544 μm; 1.56 μm; 2.52 | 0.615 μm; 1.67 μm; 2.38 (to 10 μm) | 0.743 μm; 5.12 μm; 6.61 (bi-modal) |

* inversion point is defined as when the mixture becomes water-continuous

Example 3

Runs 10–13 were conducted using various alkylphenol ethoxylates type surfactants to prepare these emulsions. Triton X-100, an POE (9) octylphenol ether or Otoxynol-9 (HLB of 13.5, Union Carbide, Dow Chemical, Midland, Mich.) and Triton X-305, an POE (30) octylphenol ether or Octoxynol-30 (HLB of 17.3, Union Carbide, Dow Chemical, Midland, Mich.) were used in different ratio, while the total surfactants in solids remained constant, thus resulted in a surfactant package with different HLB values. The polymer was the same dimethoxymethylsilyl-functional poly(isobutylene-co-paramethylstyrene), used Runs 5–9, as was the general procedure.

Water at 1.0 g per addition (equivalence of 2.0 wt. % per polymer/surfactants) was incorporated until the point of the formation of a water-continuous, creamy emulsion. The particle size profile at the point of first inversion, and the particle size profile for the 85 wt. % solids emulsion are shown in Table 3.

The elastomeric polymer used in this example was a dimethoxymethylsilyl-grafted poly(isobutylene-co-paramethylstyrene) was prepared according according to the procedures detailed in U.S. Pat. No. 6,177,519 and characterized to have 1.61% Si, Mw of 66,580 g/mole and Mn of 29,210 g/mole and a viscosity of about 160,000 Pa-s (1.6 M poise).

A 1-quart Ross mixing vessel was charged with 672 g of the silane-grafted poly(isobutylene-co-paramethylstyrene). The polymer was heated to and held at 50° C. for 2 hours, then 128 g of a petroleum hydrocarbon oil, Daphne KP-100 (490 g/mole m.w.; Apollo America Corp.) was added and mixed to form a homogeneous mixture with a set of high viscosity blades turning at about 15 rpm speed. This yielded a shear dispersion action at a shear rate of about 1.5 sec−1. The heat was turned off to allow the mixture returned to ambient temperature. A surfactant mixture consisting of 32 g of Brij 30, 64 g of Brij 35L (@ 72% solids), 32 g of Brij 97, and 2.8 g of acetic acid was charged to the polymer mixture. The shear dispersion mixing resumed at about

TABLE 3

| | Run # | | | |
|---|---|---|---|---|
| | 10 | 11 | 12 | 13 |
| Water addition rate | 2.0% | 2.0% | 2.0% | 2.0% |
| Surfactants | | | | |
| Triton X-100 | 4.6 | 3.0 | 2.4 | 0.0 |
| Triton X-305 (70% solids) | 0.0 | 2.3 | 3.1 | 6.5 |
| acetic acid | 0.12 | 0.12 | 0.12 | 0.12 |
| HLB value | 13.5 | 14.8 | 15.2 | 17.2 |
| Wt. % solids at inversion | 91.5 | 93.2 | 93.2 | 93.2 |
| Emulsion particle profile at inversion point | 0.65 μm; 4.94 μm; 7.33 (tail to 100 μm) | 0.66 μm; 4.66 μm; 6.75 (tail to 30 μm) | 0.69 μm; 7.37 μm; 10.40 (tail to 60 μm) | 0.71 μm; 3.18 μm; 4.16 |
| Final emulsion particle profile at 85% solids | 0.59 μm; 3.02 μm; 4.85 (tail to 60 μm) | 0.61 μm; 1.91 μm; 2.81 | 0.66 μm; 2.10 μm; 2.86 | 0.65 μm; 2.20 μm; 3.08 |

Example 4

This example shows a high solids emulsion of a silane-grafted PIB polymer can be prepared in a 1 quart Ross low shear mixer equipped with a set of high viscosity (HV) blades fitted to a double planetary mixing action.

15–20 rpm for two more hours. A homogeneous mixture of polymer/surfactants was obtained under this very low shear rate of 1.5 to 2.0 sec−1.

To carry out the emulsification, a small amount of deionized water was charged while the above polymer/surfactants mixture under steady shear mixing. The process began by adding 12 g of de-ionized water (equivalent of 1 to 1.5 wt. % per polymer/surfactants mixture) was incorporated into the above polymer/surfactants mixture while under a steady shear dispersing mixing with the HV blades turning at about 20 rpm (or a shear rate of 2 sec−1). The mixing continued until the water was fully incorporated into the mixture, typically about 10–15 minutes. A next water addition of 12–18 g quantity (approximate 1 to 2 wt. % of polymer/surfactants mixture) was introduced while the shear mixing action continued. No subsequent water addition was allowed until the previous water was fully incorporated. This gradual incorporation of water in small intervals continued while the mixture is under efficient shear dispersion mixing. When a total of about 46 g de-ionized water was successfully incorporated, a water-dilutable, emulsion was formed. This water-dilutable, smooth and creamy emulsion has a solids content of 93.5 wt. %. This high solids emulsion has an average particle size of 0.753 μm (D(v, 0.5)), 1.93 micrometers at 90 percentile (D(v, 0.9)), and a span of 2.23.

An additional 80 g of de-ionized water was incorporated into the just produced emulsion to give a uniform emulsion with a solids content of about 86%. This was done using a regular mixing/stirring device. The emulsion has the following emulsion particle size profile: D(v, 0.5) of 0.779 micrometers, D(v, 0.9) of 1.95 micrometers, and a span of 2.15.

Example 5

The elastomeric polymer used in the following example was a dimethoxymethylsilyl-grafted poly(isobutylene-co-paramethylstyrene), prepared according to the procedures detailed in U.S. Pat. No. 6,177,519 and characterized to have 1.61% Si, Mw of 66,580 g/mole and Mn of 29,210 g/mole and a viscosity of 160,000 Pa-s (1.6 M poise).

A 1-quart Ross mixing vessel was charged with 650 g of a silane-grafted poly(isobutylene-co-paramethylstyrene). The polymer was heated to and held at 50° C. for about 2 hours. A surfactant mixture consisting of 71 g of Brij 35L (@ 72% solids), 40 g of Brij 97, and 2.0 g of acetic acid was charged to the polymer mixture. The shear dispersion mixing resumed at about 15 rpm (equivalent shear rate of 1.5 sec−1) for one hour, then raised mixing speed to 130 rpm (about 13 sec−1). A homogeneous mixture of polymer/surfactants was obtained. Water was gradually added to the polymer/surfactant mixture at a rate of 2 g every 5 minutes, and repeated until a total of 45 g water was added and a water-continuous, creamy emulsion was observed. After this point, additional 105 g dilution water was incorporated and mixed to homogeneous. The emulsion was measured to have sub-micron particle size and profile.

Example 6

Two commercial samples of a dimethoxymethylsilyl-terminated polypropyleneoxide polyether, MS203H having a viscosity of 16 Pa-s and MS303H having a viscosity of 26 Pa-s, both from Kaneka Corporation were used to prepare mixtures of elastomeric polymers for emulsification. These dimethoxymethylsilyl-terminated polypropyleneoxide polyethers were mixed with two types of dimethoxysilyl-functional elastomers: a dimethoxylsilyl-functional poly(isobutylene-co-para-methylstyrene) copolymer prepared according to the procedures detailed in U.S. Pat. No. 6,177,519 and having a viscosity of 0.15 M KPa.s (1.5M poise); and Epion 300S a dimethylsilyl-terminated polyisobutylene (Si-PIB) having a number-average molecular weight of 10,000 g/mole, and a viscosity of 1.6 KPa-s, obtained commercially from Kaneka Corporation.

As shown in Table 4, emulsions of silane-functional curable elastomeric emulsions consisting of silane-grafted poly(isobutylene-co-p-methylstyrene) and silyl-functional polyether were successfully prepared. A water-continuous and water-dilutable emulsion at as high as 94 wt. % solids was formed and was dilutable to a weight % solids of 75.0 or higher.

TABLE 4

| SiPIB polymer batch type | Si-(PIB-pMS) | Epion 300S |
|---|---|---|
| Polymer batch | Kaneka MS S303H | Kaneka MS S203H |
| SiPIB polymer | 20.0 g | 20.0 g |
| Polyether polymer | 20.0 g | 20.0 g |
| Brij 35L (72% solids) | 3.0 g | 3.0 g |
| Brij 97 | 1.4 g | 1.4 g |
| Acetic acid | 0.12 g | 0.12 g |
| Water, to formation (0.5 g each addition) | 4.8 g | 2.0 g |
| D.I. Water, dilution | 9.4 g | 7.3 g |
| Wt. % solids at formation | 90.0 | 94.0 |
| Wt. % solids, final | 75.0 | 81.1 |
| PH @ 25 C | 7.249 | 7.25 |
| Particle size profile, initial | | |
| D(v, 0.5), micrometers | 0.417 | 0.47 |
| D(v, 0.9), micrometers | 1.71 | 1.04 |
| Span | 3.83 | 1.9 |

Example 7

Silane-grafted poly(isobutylene-co-p-methylstyrene), prepared according to the procedures detailed in U.S. Pat. No. 6,177,519, was pumped, via a gear pump, into a 25 mm twin-screw extruder, the mixture consisting of Brij 35L, Brij 97, and acetic acid was incorporated via a precision metering pump into the extruder and was shear mixed to form a homogeneous polymer premix. To effect the emulsification, multiple water additions, each at a prescribed weight % of the polymer premix, were gradually incorporated into the twin-screw extruder via precision metering pumps. To produce emulsions of desirable particle size profile, the initial water additions were kept at 1.2 to 2.0 wt. % of the polymer premix, and the water was fully dispersed and incorporated into the polymer premix prior to subsequent water addition.

As shown in Table 5, emulsions up to about 94 weight % solids and averaged particle size of about 0.5 micrometers were produced, and as little as 6 weight % of water was needed to produce high quality emulsion of plasticizer-free curable elastomeric polymers. The water was introduced via injection ports from 1 through 5.

TABLE 5

| | Run # | | | | | | | | |
|---|---|---|---|---|---|---|---|---|---|
| | 14 | 15 | 16 | 17 | 18 | 19 | 20 | 21 | 22 |
| SiPIB polymer, g/min | 179 | 179 | 179 | 179 | 179 | 179 | 179 | 179 | 179 |
| Acetic acid, g/min | 0.78 | 0.78 | 0.78 | 0.78 | 0.78 | 0.78 | 0.78 | 0.78 | 0.78 |
| Brij 35L (72%), g/min | 20.5 | 20.5 | 20.5 | 20.5 | 20.5 | 20.5 | 20.5 | 20.5 | 20.5 |
| Brij 97, g/min | 9.7 | 9.7 | 9.7 | 9.7 | 9.7 | 9.7 | 9.7 | 9.7 | 9.7 |
| water 1, g/min | 4.0 | 4.0 | 4.0 | 4.0 | 4.0 | 4.0 | 4.0 | 2.4 | 2.4 |
| water 2, g/min | 4.0 | 4.0 | 4.0 | 4.0 | 4.0 | 4.0 | 4.0 | 2.4 | 2.4 |
| water 3, g/min | | 12.5 | 15.0 | 15.0 | 12.5 | 15.0 | 12.5 | 12.5 | 12.5 |
| water 4, g/min | | 12.5 | 15.0 | 15.0 | 12.5 | 15.0 | 12.5 | 12.5 | 12.5 |
| water 5, g/min | | | | | 20.0 | 30.0 | 25.0 | 0.0 | 25.0 |
| Total water added, g/min | 13.7 | 38.7 | 43.7 | 43.7 | 58.7 | 73.7 | 63.7 | 35.5 | 60.5 |
| total amount produced, g/min | 218.0 | 243.0 | 248.0 | 248.0 | 263.0 | 278.0 | 268.0 | 239.8 | 264.8 |
| Water 1 rate, wt. %/premix | 2.0 | 2.0 | 2.0 | 2.0 | 2.0 | 2.0 | 2.0 | 1.2 | 1.2 |
| Water 2 rate, wt. %/premix | 2.0 | 2.0 | 2.0 | 2.0 | 2.0 | 2.0 | 2.0 | 1.2 | 1.2 |
| Water 3 rate, wt. %/premix | | 6.1 | 7.3 | 7.3 | 6.1 | 7.3 | 6.1 | 6.1 | 6.1 |
| Water 4 rate, wt. %/premix | | 6.1 | 7.3 | 7.3 | 6.1 | 7.3 | 6.1 | 6.1 | 6.1 |
| Water 5 rate, wt. %/premix | | | | | 9.8 | 14.7 | 12.2 | 0.0 | 12.2 |
| Screw speed, rpm | 300 | 300 | 300 | 400 | 400 | 400 | 400 | 800 | 1200 |
| Average shear rate, sec-1 | 94.2 | 94.2 | 94.2 | 125.6 | 125.6 | 125.6 | 125.6 | 251.2 | 376.8 |
| Wt. % solids | 93.7 | 84.1 | 82.4 | 82.4 | 77.7 | 73.5 | 76.2 | 85.2 | 77.1 |
| Particle size, initial | | | | | | | | | |
| D(v, 0.5), micrometers | 0.533 | 0.647 | 0.624 | 0.573 | 0.64 | 0.669 | 0.629 | 0.665 | 0.673 |
| D(v, 0.9), micrometers | 1.69 | 1.77 | 1.7 | 1.64 | 1.63 | 1.65 | 1.64 | 1.79 | 1.77 |
| Span | 2.92 | 2.48 | 2.47 | 2.61 | 2.26 | 2.18 | 2.34 | 2.42 | 2.36 |

Example 8

To illustrate the process of the present invention for making emulsions of extremely high viscosity and molecular weight elastomeric polymers, butyl rubber elastomer of about Mooney 35 elasticity was obtained from Bayer Rubber Inc and emulsified. The butyl rubber had a weight-average molecular weight of 407,900 g/mole, number-average molecular weight of 119,200 g/mole, and a viscosity of about 100,000 KPa-s (or 1000 M poise).

A polymer premix of butyl rubber was first prepared by incorporating KP-100 hydrocarbon oil (a about 103 cPs viscosity oil from Apollo America Corp.) into the butyl rubber and shear mixed to homogeneous consistency. The surfactant was a reaction mixture product of isostearic acid and diethanolamine (ISA-DEA) at 50C at about 2 to 1 ratio by weight.

Runs 23–27 were carried out on a twin-screw extruder. The polymer premix was pumped into the extruder through a gear pump, the surfactant was pressure-pumped into the barrel, sufficient time was allowed for the surfactant to fully incorporated into the polymer premix. Water was introduced downstream through 4 separate addition ports, (port 1 through 4). The amount of water incorporated was controlled at a rate that ranged from 1.1 to 2.9% by weight of the polymer premix plus surfactant.

Emulsions of this extremely high viscosity and high molecular weight butyl rubber were successfully produced without any organic solvents, as summarized in Table 6.

TABLE 6

| | Run # | | | | | | | | |
|---|---|---|---|---|---|---|---|---|---|
| | 23 | 24 | 25 | 26 | 27 | 28 | 29 | 30 | 31 |
| Polymer premix flow | 118.5 | 118.5 | 118.5 | 118.5 | 118.5 | | | | |
| Butyl rubber polymer, g/min | 79.04 | 79.04 | 79.04 | 79.04 | 79.04 | 79.04 | 79.04 | 90.45 | 101.72 |
| KP-100 hydrocarbon oil | 39.46 | 39.46 | 39.46 | 39.46 | 39.46 | 39.46 | 39.46 | 45.15 | 50.78 |
| ISA-DEA amide surfactant | 23.7 | 23.7 | 23.7 | 23.7 | 23.7 | 23.7 | 23.7 | 27.1 | 30.5 |
| water 1, g/min | 4.0 | 4.0 | 4.0 | 3.0 | 3.0 | 2.0 | 2.0 | 2.0 | 2.0 |
| water 2, g/min | 4.0 | 4.0 | 4.0 | 3.0 | 3.0 | 3.0 | 3.0 | 2.0 | 2.0 |
| water 3, g/min | 6.0 | 6.0 | 6.0 | 5.0 | 5.0 | 5.0 | 5.0 | 4.0 | 4.0 |
| water 4, g/min | 7.0 | 7.0 | 7.0 | 6.0 | 6.0 | 5.0 | 5.0 | 4.0 | 4.0 |
| Total water, g/min | 21.0 | 21.0 | 21.0 | 17.0 | 17.0 | 15.0 | 15.0 | 12.0 | 12.0 |
| total amount, g/min | 163.2 | 163.2 | 163.2 | 159.2 | 159.2 | 157.2 | 157.2 | 174.7 | 195.0 |
| Water 1 rate, wt. %/premix | 2.8 | 2.8 | 2.8 | 2.1 | 2.1 | 1.4 | 1.4 | 1.2 | 1.1 |
| Water 2 rate, wt. %/premix | 2.8 | 2.8 | 2.8 | 2.1 | 2.1 | 2.1 | 2.1 | 1.2 | 1.1 |
| Water 3 rate, wt. %/premix | 4.2 | 4.2 | 4.2 | 3.5 | 3.5 | 3.5 | 3.5 | 2.5 | 2.2 |
| Water 4 rate, wt. %/premix | 4.9 | 4.9 | 4.9 | 4.2 | 4.2 | 3.5 | 3.5 | 2.5 | 2.2 |

TABLE 6-continued

| | Run # | | | | | | | | |
|---|---|---|---|---|---|---|---|---|---|
| | 23 | 24 | 25 | 26 | 27 | 28 | 29 | 30 | 31 |
| Screw speed, rpm | 200 | 400 | 300 | 300 | 400 | 300 | 400 | 200 | 250 |
| Average shear rate, sec-1 | | | | | | | | | |
| Wt. % solids | 87.0 | 87.0 | 87.0 | 89.2 | 89.2 | 90.3 | 90.3 | 93 | 93.8 |
| Particle size, initial | | | | | | | | | |
| D(v, 0.5), micrometers | 22.13 | 27.94 | 38.71 | 14.32 | 31.14 | 30.98 | 31.38 | 21.5 | 28.82 |
| D(v, 0.9), micrometers | 72.45 | 76.33 | 89.68 | 58.03 | 79.28 | 76.41 | 75.85 | 96.08 | 53.04 |
| Span | 3.26 | 2.72 | 2.3 | 4.04 | 2.54 | 2.45 | 2.4 | 4.46 | 1.3 |

Example 9

An emulsion of an experimental alpha, omega diallyterminated polyisobutylene (PIB) polymer, obtained from Kaneka Corp. (Kanegafuchi Chemical Industry Co. Ltd. Tokyo, Japan and Kaneka America Corp, New York, N.Y.) (having a zero-shear viscosity of 8.58 KPa-s (85,800 poise), a number-average molecular weight Mn of 19,380 g/mole, and an estimated glass-transition temperature of −60 C was prepared according to the following procedure.

A premix was prepared by combing 40.0 g of the diallyPIB polymer, 2.6 g of Brij 35L and 1.7 g of Brij 97 surfactants and shear mixing to form a homogeneous premix in a bench-top Hauschild universal mixer (Hauschild Dental mixer, Flacteck, Landrum, S.C.). To this premix, de-ionized water was incorporated at such at only 0.5 to 1.0 g was added each time into the premix, the water was spun at 3000 rpm rate in a bench-top Hauschild mixer (an equivalent shear of 1032 sec−1) until it thoroughly dispersed in the mixture prior to the next water addition. The amount of water represented about up to 2.5 wt. % of the polymer. The final emulsion of allyl-PIB elastomer was a water-dilutable creamy emulsion with an average particle size profile D(v, 0.5) of 0.275 micrometers, and 90 percentile D(v, 0.9) of 0.60 micrometers. Excellent stability was observed.

Example 10

Two emulsions containing selected organic plasticizers were prepared. The compositions and the emulsion properties are shown in Table 7. They were prepared by incorporating the respective plasticizers into the silane-grafted poly(isobutylene-co-p-methylstyrene), prepared according to the procedures detailed in U.S. Pat. No. 6,177,519, followed by dispersing the Brij 97 and Brij 35L surfactants and acetic acid into the plasticized polymer mixture. To the homogeneous polymer premix, water at 0.5 to 1.0 g quantity at each addition, was added and shear dispersed and mixed into the polymer premix, followed by a high shear mixing in a bench-top Hauschild universal mixer to fully disperse the water into the premix. Multiple water additions were made until a smooth creamy emulsion was formed. The emulsions had 85+% by weight solids and sub-micron particle size. They are stable at storage and readily dilutable in water to lower solids levels.

TABLE 7

| SiPIB polymer | 40.0 g | 40.0 g |
|---|---|---|
| KP-100 hydrocarbon oil | 8.0 g | |
| DIOA (diisooctyl adipate) ester | | 12.0 g |
| Brij 97 | 2.0 g | 2.1 g |

TABLE 7-continued

| Brij 35L (72% solids) | 4.0 g | 4.1 g |
|---|---|---|
| Acetic acid | 0.12 g | 0.12 g |
| Water | 10.3 g | 14.5 g |
| Final emulsion | smooth, creamy | smooth, creamy |
| Wt. % solids | 87.2 | 86.2 |
| Particle size profile | | |
| D(v, 0.5), micrometers | 0.64 | 0.343 |
| D((v, 0.9), micrometers | 1.59 | 0.57 |
| Span | 2.06 | 1.03 |

We claim:

1. A process for preparing a water-continuous emulsion of an elastomeric polymer that is essentially free of organic solvents and having a solids content of greater than 75%, an average particle size less than 5 μm, and having sufficient stability to produce a stable lower solids emulsion upon dilution with water comprising the steps of:
   (I) forming a premix comprising;
      (A) 100 parts of an elastomeric polymer having a viscosity of 0.5 to 1,000,000 KPa-s and a glass transition temperature up to 50° C.
      (B) 3 to 30 parts of a surfactant,
         wherein the premix is essentially free of organic solvents,
   (II) adding
      (C) 5 to 45 pans water to the premix with mixing thereby forming the water-continuous emulsion of the elastomeric polymer.

2. The process of claim 1 wherein the water is added to the premix in incremental portions, whereby each incremental portion comprises less than 8 weight % of the premix and each incremental portion of water is added successively to the previous after the dispersion of the previous incremental portion of water, wherein sufficient incremental portions of water are added to form the water-continuous emulsion of the elastomeric polymer.

3. The process of claim 2 wherein each successive incremental portion of water comprises less than 4 weight % of the premix.

4. The process of claim 2 wherein each successive incremental portion of water comprises less than 2 weight % of the premix.

5. The process of claim 1 wherein the elastomeric polymer is a silylated copolymer of an isomonoolefin and a vinyl aromatic monomer.

6. The process according to claim 1 wherein the premix further comprises (D) a plasticizer.

7. The process of claim 1 wherein the premix further comprises (E) a low molecular weight acid.

8. The process of claim 1 wherein the premix further comprises (E) a low molecular weight acid.

9. The process of claim 1 wherein 5 to 30 parts of water are added to the premix.

10. The process of claim 1 wherein 5 to 20 parts of water are added to the premix.

11. The process of claim 1 further comprising the step of;
(III) mixing additional water to the water-continuous emulsion of the elastomer polymer to form a diluted emulsion of the elastomer polymer.

12. The process of claim 1 wherein the mixing is provided by a continuous mixer.

13. The process of claim 12 wherein the continuous mixer is an extruder.

14. The process of claim 1 wherein the mixing is provided by a batch mixer.

15. A process for preparing a water-continuous emulsion of an elastomeric polymer comprising the steps of:
(I) forming a premix comprising;
  (A) 100 parts of an elastomeric polymer having a viscosity of 0.5–1,000,000 KPa-s and a glass transition temperature up to 50° C,
  (B) 3 to 30 parts of a surfactant,
(II) adding
  (C) 5 to 45 parts water to the premix with mixing
    thereby forming a water-continuous emulsion of the elastomeric polymer having a solids content of greater than 75%, an average particle size less than 5 μm, and having sufficient stability to produce a stable lower solids emulsion upon dilution with water, wherein the water is added to the premix in incremental portions; whereby each incremental portion comprises less than 8 weight % of the premix and each incremental portion of water is added successively to the previous after the dispersion of the previous incremental portion of water, wherein sufficient incremental portions of water are added to form the water-continuous emulsion of the elastomeric polymer.

* * * * *